May 28, 1946.  W. DILLEY  2,401,056
INDUSTRIAL SAFETY SHIELD
Filed Sept. 23, 1944   3 Sheets-Sheet 1
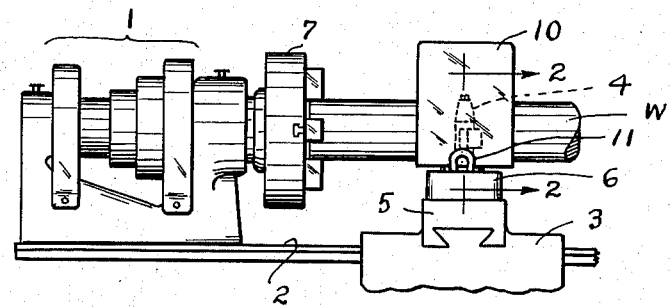
FIG. 1
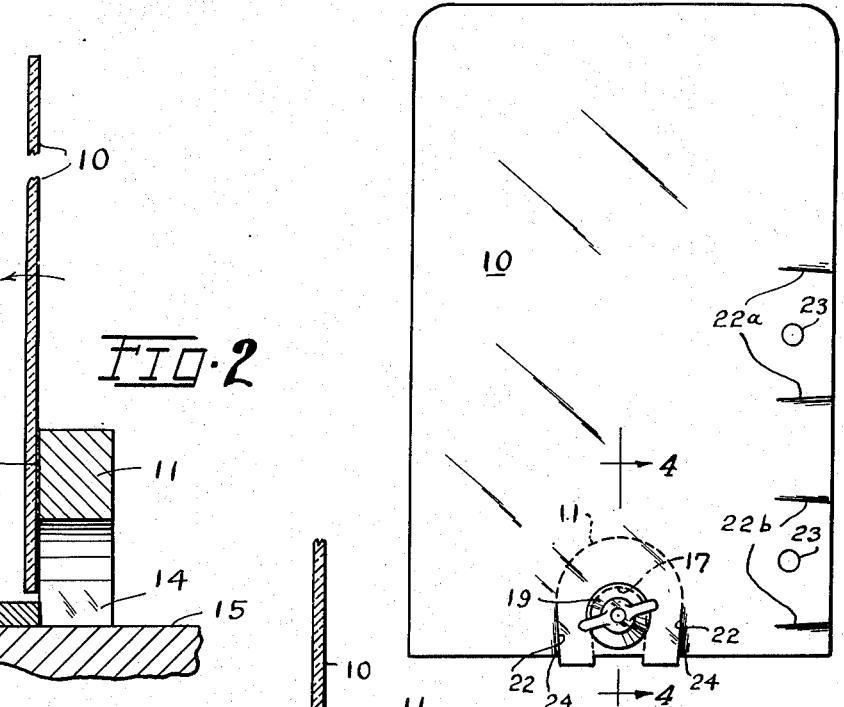
FIG. 2
FIG. 3
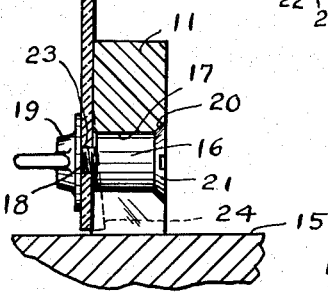
FIG. 4
INVENTOR.
WILLIAM DILLEY
BY John N. Leonard
ATTORNEY May 28, 1946.   W. DILLEY   2,401,056
INDUSTRIAL SAFETY SHIELD
Filed Sept. 23, 1944   3 Sheets-Sheet 2

INVENTOR.
WILLIAM DILLEY
BY John L. Leonard
ATTORNEY

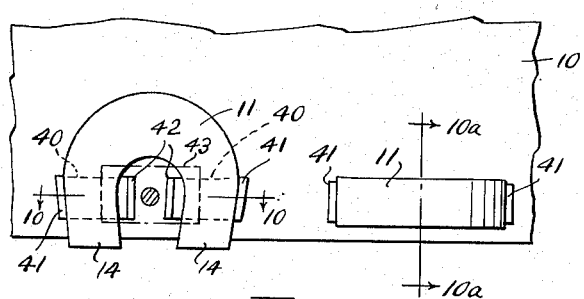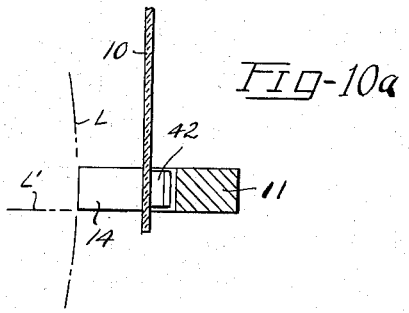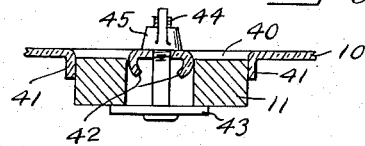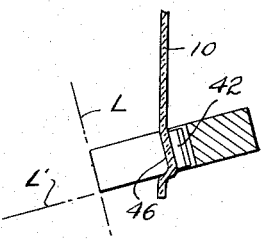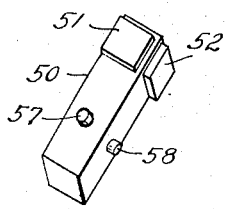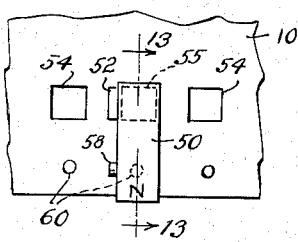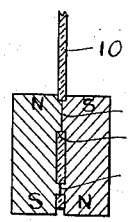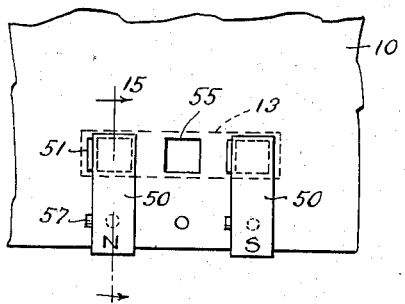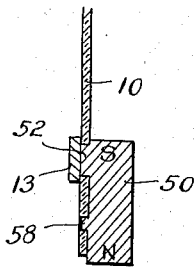

Patented May 28, 1946

2,401,056

UNITED STATES PATENT OFFICE 2,401,056

INDUSTRIAL SAFETY SHIELD

William Dilley, Cleveland, Ohio

Application September 23, 1944, Serial No. 555,457

14 Claims. (Cl. 160—351)

This invention relates to an industrial safety device in the nature of a shield which device is applicable to metal working machines of practically all types in a manner to protect the eyes and face of the workman attending the machine against injury from flying chips or particles ("sparks") thrown off by the operation of the tool on the work.

Workmen while performing grinding and other material cutting operations on power tools are usually expected or ordered to wear goggles or windowed helmets. Both of the latter are uncomfortable and likely to be obscured by condensed perspiration and become smeared and scratched from dirty and oily hands. Therefore, the workmen dislike wearing such goggles and helmets and frequently neglect or refuse to do so.

Mountings on industrial machines for protective shields have been rather highly developed with the view to enabling the shields such as sheets of glass or transparent plastic to be moved from one location to another on the machines so as to afford as full protection as possible for the eyes and face of the workmen while not interfering with the necessary manual operations. Practically all of the previously proposed machine-attached devices require fittings or clamps for attachment of the devices to the machines equipped therewith. These are expensive, require too much time either to apply or adjust them in proper position, or lack sufficient adjustment capabilities to enable the workmen to be fully protected when in the positions usually occupied by the workmen in each case. Even when flexibly adjustable members such as universal joints and flexible metal rods or conduits are used to support the shields, no great amount of variation in shield position is available and always an attaching base is required which is limited as to location on the machine and requires fasteners. The present need for a universally applicable, quickly attachable or demountable safety shield which does not have to be worn by the user is apparent from the above discussion. The primary object of the present invention is to fill that need.

A specific object is to provide a simple means for supporting protective shields of the type referred to above which means will be certain to operate to hold the shield in the desired position as long as it is needed in that position but which will enable the workman readily to remove the shield to new positions.

Since practically all machine tools including grinders have either generally flat or gradually curved surfaces of ferrous metal and of considerable extent at some position sufficiently close to the zone of operation of the work and which remain in fixed relation to that zone even though the zone may vary in position on the machine, a simple permanent magnet with high attractive force forms a highly practical means for mounting a suitable shield in the necessary protective position. The device hereof when mounted on a tool holder or table moves therewith so that the zone of protection afforded by the shield is always at the source of danger to the workman. The shield hereof is preferably of light weight, non-shatterable material such as a transparent plastic or plastic-reinforced glass attached to the magnet.

A further specific object is to provide a combined protective shield and support which latter employs a permanent magnetic force as the essential attaching factor in reference to parts of the machine made of iron, steel or other magnetic material.

The magnet may, of course, be of any suitable shape, may have one or more poles adapted for shield-supporting contact with the machine part at different pole faces and may be either movably or immovably secured to the transparent or substantially transparent shield; and the shield may be of any desired shape.

Referring to the drawings showing exemplary forms of the invention:

Fig. 1 is a side view of a portion of an illustrative machine tool on which one form of the present protective screen or shield device is shown mounted in one selected position;

Fig. 2 is a vertical sectional view of the device as indicated by the line 2—2 on Fig. 1;

Fig. 3 is a front elevation of a different form of protective device;

Fig. 4 is a vertical sectional view thereof as indicated by the line 4—4 on Fig. 3;

Fig. 9 is a composite elevational view showing a transparent shield with attaching magnets mounted thereon with the poles of the magnets extending in divergent directions;

Figs. 10 and 10a are detail cross sectional views as indicated on Fig. 9;

Figs. 10b is a cross sectional view similar to Fig. 10a but with a slight modification;

Fig. 11 is a perspective view of a generally straight magnet for use in identical pairs to form in effect a horseshoe magnet;

Figure 5:
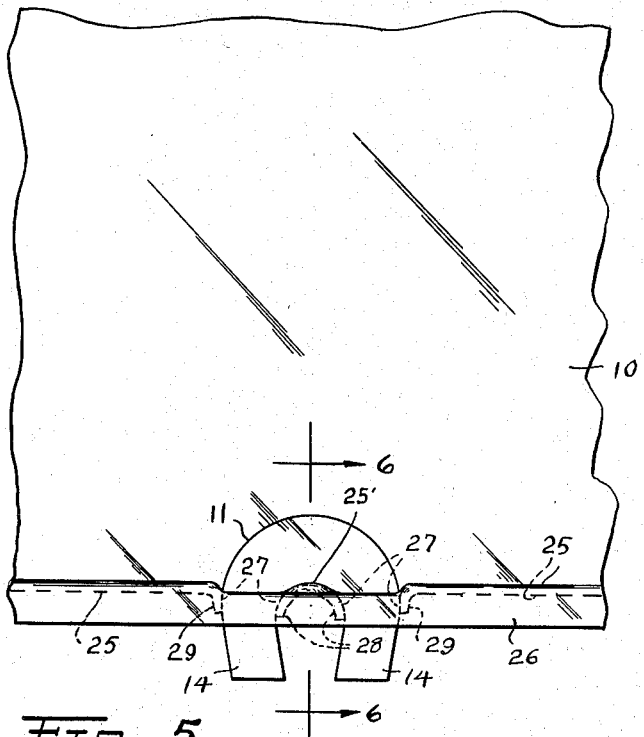
Figs. 5 and 6 are views corresponding to Figs. 3 and 4, showing a further modification in the manner of securing a magnet to the transparent shield member.

Figs. 12 and 13 are fragmentary side elevational and cross sectional views showing one manner in which the paired magnets of Fig. 11 are used; and Figs. 14 and 15 are views corresponding to Figs. 12 and 13 showing a different manner of use of magnets according to Fig. 11.

In Fig. 1, showing a typical form of machine tool, specifically a lathe, 1 represents the head stock of the lathe, 2 the horizontal bed or rail carrying the usual tool slide 3 on which the tool post 4 is usually mounted on a cross slide 5. The tool post support or base 6 is usually bolted or screwed to the cross slide 5. The operating mechanism for the two slides is omitted from the illustration. A work holding chuck 7 is shown as holding a work piece W on which a tool carried by the tool post 4 is adapted to operate. Since the metal working operation performed by a machine tool such as shown is always in the vicinity of the tool post support, the most convenient location for the shield is on said support. In the case of a grinder there is always a suitable surface associated with the tool for attachment of the magnet pole ends or co-planar side faces to enable supporting and positioning of the shield in protective relation to the eyes and face of the operator. Grinding wheels usually require guards adjacent a considerable portion of the periphery of the wheel, particularly over and behind the wheel, to prevent serious injury to the operator and others in event the wheel flies apart. Additionally, such wheels are usually provided with a generally horizontal rest surface as a support for the work or the hand of the workman holding the work and spaced below the lower forward end of the guard. The safety shield hereof in any of the forms described below can be applied readily either to such guard or to the rest surface, assuming these are ferrous metal, and in various positions on each appropriate for affording safety both for peripheral and side-wheel-face grinding.

In the particular form of shield device shown in Figs. 1 and 2, 10 represents the shield in the form of a suitable rectangular section of transparent plastic material, for instance methyl acrylate, examples of which are "Plexiglas" and "Lucite." Both adequately resist abrasion by flying metal sparks and chips. The magnet as shown is simply a horseshoe type permanent magnet 11 preferably made of highly magnetic saturation alloys such, for instance, as iron, nickel and aluminum or iron, nickel, aluminum and cobalt which may be either cast or formed by sintering process as is well known. Suitable magnets for the purpose are made by The Crucible Steel Company of America under the names "Alnico" and "Alnic." The magnets made from the materials mentioned above can readily be ground to machine them but they are usually too hard to be machined in the ordinary sense as by drilling or milling with conventional tools. Accordingly, I recommend as the simplest method of attaching the shield to the magnet a cement, a film of which is shown at 12, Fig. 2, and is exaggerated in thickness. The film has highly adhesive properties in respect both to the plastic and the magnet material or such surface protective materials as are usually used on the magnets, e. g., hard enamel or paint. A satisfactory cement, as an example, is now on the market under the name "Testor's Crystal Clear Cement." When said cement is applied evenly on the magnet surface and/or a similar area of the shield and the two members are pressed together firmly it will, after setting of the cement, withstand a considerable pull before the members become even partially detached. In all the modifications shown cement may be used in addition to the other fastening means described.

In applying the magnet 11 to a peripheral surface guard of a grinder such as mentioned above the co-planar side faces of the magnet would usually be placed against the gradually curved surface of the guard so that the shield projects forwardly and downwardly over the working zone in overhanging relation to said zone and at any desired angle depending upon the selected position. For side wheel surface grinding the same pole faces can usually be applied to the edges of the guard. The pole end or side faces can usually be applied to the work or hand rest in such position as advantageously to support and position the shield.

Most horseshoe magnets of the type identified above are supplied with a keeper bar of soft iron. Such keeper bar is shown at 13, Fig. 2, in the position in which it may be utilized as a mechanical buttressing support for the shield through the poles 14 of the magnet 11 by the attractive forces thereof on the keeper bar. The keeper bar 13 for the above purpose is applied to whichever side of the magnet may need or can utilize additional support to prevent accidental detachment of the magnet from the machine part to which applied, viz., part 15 in Fig. 2. The bar, of course, does not tend to adhere magnetically to the support such as 15 but since the bar is strongly held by the magnet poles in a position such as suggested by Fig. 2, the bar forms a flange effect adjacent the poles for resisting to some extent a thrust on the shield transverse to its principal plane, as in the direction of the arrow indicated on Fig. 2, which thrust would tend to rock the assembly about the lower left corners of the pole surfaces as a pivot.

In event it is desired to prevent the magnet from attracting chips and shavings cut from the work, the shield portion 10 of the device would completely overlie the magnet on the attached face rather than stopping short of a position flush with the pole ends as shown in Fig. 2.

The magnet will support the shield just as adequately when the side faces of the poles 14 are applied to a supporting ferrous surface. That particular manner of mounting of the device on the machine is not illustrated. By having the lower edge of the sheet set back from the pole ends, as in Fig. 2, for example, either set of side faces of the magnet poles are available for application to ferrous supports.

Referring to Figs. 3 and 4 these illustrate a readily detachable arrangement for connecting the shield to the magnet, the same being in the form of a bolt 16 of suitable diameter so that it will snugly occupy the throat 17 of the magnet and be held therein as by press fitting or through the use of suitable cement. The end of the bolt adjacent the shield has a reduced threaded projection 18 adapted to pass through a hole 23 in the shield and to which a readily detachable nut 19 is secured in a manner to clamp the shield against the adjacent face of the magnet. One means for preventing endwise movement of the bolt toward the face of the magnet against which the shield is clamped may comprise provision of a partial counterbore formation 20 on the magnet at its throat and a suitable head such as the flared head 21 on the bolt complementary to the counterbore surface 20. Such counterbore surface 20 may easily be formed by a grinding operation.

A suitable means for preventing movement of the shield in its principal plane when attached to the magnet as by a single fastener such as might or would normally serve as a pivot about which the shield could rotate out of position may comprise slitting the sheet constituting the shield as on each side of the magnet as illustrated at 22, Fig. 3. At the lower portion of Fig. 3 the material adjacent the slit is shown bent out of the principal plane of the sheet to form abutment portions 24. The relationship of the abutment edges to the side of the magnet is brought out by comparison of Fig. 3 and Fig. 4. The abutment portions prevent rotation of the shield about the reduced threaded portion 18 of the attaching bolt even though the nut 19 is not tightly forced against the shield.

A further modification is suggested by Fig. 3 wherein two openings 23 for the fastener 16 are shown, one substantially centrally of one longer side of the shield and the other offset from the center as near one corner. Slit portions of the sheet at 22a and 22b indicate positions of the magnet 11 respective to the selected fastener positions at the holes 23. Thus in cases where less height than width is desired for the shield the magnet would occupy a position on a longer edge of the shield and when greater height than width is desired then the position of the magnet would be as illustrated. Additionally, if the only available surface on which to attach the magnet were off center with respect to the zone of operation of the tool on the work, an off center position for the magnet, such as between the abutments 22b, Fig. 3, would be selected.

Figure 6:
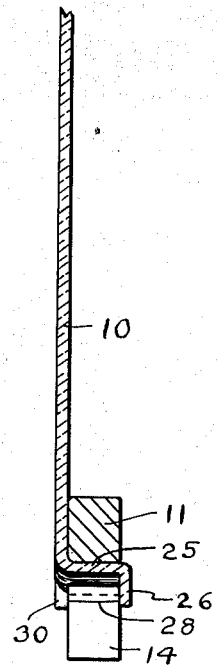

Referring to the form of the invention shown in Figs. 5 and 6 this constitutes a means for securing the shield 10 rigidly to the magnet 11 without special fasteners or cement. In the particular arrangement shown the shield (assuming this is of thermoplastic material such as identified above and which may be heated for deformation) is bent to form a flange as at 25, apertured at 27 to receive both legs or poles of the magnet; and the flange 25 is further bent to form a flange 26 parallel to the shield so as to lie against the main face of the magnet opposite that adjacent the shield. Adjacent the apertures 27 the sheet material is further flanged as at 28 and 29, Fig. 5. The flanges 28 are extended to engage inside or adjacent downwardly convergent edge surfaces of the magnet legs and the flanges 29 may similarly engage outside or relatively remote downwardly convergent edge surfaces. The flanges 28 thus prevent the magnet from being lifted out of position on the shield and the connecting part 25' of flange 25 cooperates with the flanges 29 to prevent downward displacement of the magnet in the plane of the shield forming sheet. Narrow short flanges 30 (Fig. 6 only, one being shown) may extend in the principal plane of the sheet 10 opposite the flange 26 to prevent rocking movement of the magnet out of position transversely to the principal plane of the shield.

Figure 7:
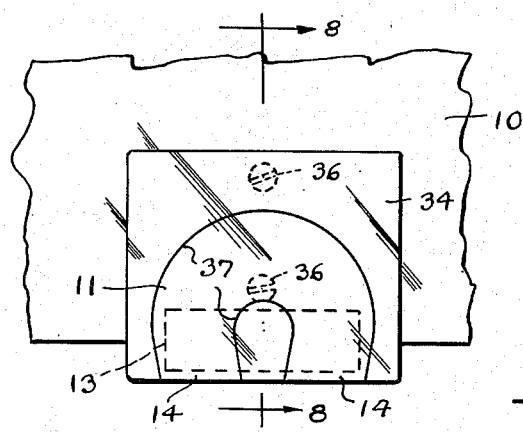
Figs. 7 and 8 are fragmentary views corresponding to Figs. 3 and 4 showing a still further modified form of magnet attachment.
Figure 8:
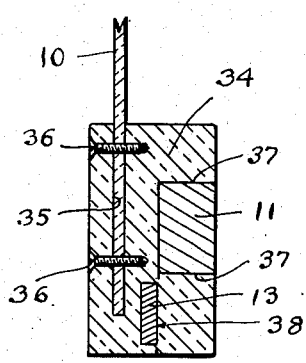

In the form shown by Figs. 7 and 8, a special block 34 of moldable material such as a plastic is provided to receive the shield 10 as in a cross slot 35 and fasteners such as screws 36 are shown as entering the material of the block and openings in the shield, such fasteners being screw threaded into the block. The magnet 11 is recessed into the side of the block generally opposite the side which carries the shield 10 as in a molded recess 37 substantially the shape of the magnet, both at its inner and outer peripheral surfaces as clearly indicated by Fig. 7. The magnet may be contained in such recess solely by friction; by the use of cement or by magnetic attraction for the keeper bar 13 which in the particular instance shown is embedded into the material of the block 34 with one face, indicated at 38, exposed in the recess 37 in position to make direct contact with the normally concealed major face of the magnet, i. e., in "magnet-keeping" relation to the pole ends 14. This arrangement provides somewhat greater mechanical support for the magnet than is afforded by the usual end face areas of the poles and at the same time protects the entire face of the magnet which is disposed toward the shield against accumulations thereon of chips and shavings.

Referring to Figs. 9 and 10 the shield-constituting sheet 10 has a pair of apertures 40 from which flanges 41 and 42 extend in pairs. The magnet 11 is placed with one of its main faces against the sheet 10 so that the legs which form the poles 14 are disposed between the respective pairs of flanges, for the purpose of maintaining the magnet against rotation in its principal plane, very much as accomplished by the abutments 22 according to Fig. 3. So positioned the magnet may be secured to the sheet by adhesive or by a removable bolt and nut having a head 43, shank 44 and nut 45. Essentially the same construction or adaptation of the sheet 10 enables the magnet to extend, for supporting the sheet, at right angles to the principal plane of the sheet as brought out by Fig. 9 at the right and by Figs. 10a and 10b. The magnet pole portions project through the apertures 40 and the inner and outer faces of the legs frictionally engage the flanges 41 and 42 which may be extended as much as necessary in order firmly to embrace the adjacent surfaces of the magnet, for example as in Figs. 5 and 6.

Fig. 10b is for the purpose of illustrating that the magnet can be at an oblique angle with reference to the principal plane of the sheet 10, this being simply a matter of forming the opening and/or flanges and/or intermediate portions of the sheet as at 46 at the desired angles so as to be generally complementary to the engaged surfaces of the magnet. The arrangement according to Fig. 10a for example enables supporting of the shield as against a surface indicated by the broken line L, shown as somewhat curved, or against a surface according to line L', which is generally at right angles to the surface indicated at L. According to Fig. 10b the shield would be supported on either type of surface as at L and L', neither of which surface is parallel or perpendicular to the principal plane of the shield.

Referring to Fig. 11, the generally straight magnet 50 there shown has projections 51 and 52, one of which, for instance 52, is longer than the other. The projections may be non-circular in transverse section so as to engage complementary non-circular openings in the sheet and thus hold the magnet in position against rotation parallel to the plane of the sheet. Figs. 12 and 14 show three rectangular openings, there being a pair of openings 54 at each side of an intermediate opening 54. With the pair of magnets according to Fig. 11 placed with their shorter projections 51 in the opening 55 and with the magnets extending parallel to each other on opposite sides of the sheet, the arrangement constitutes a horseshoe magnet having opposite poles as at N and S for contact with a ferrous supporting surface which, for instance, is narrow in a plane perpendicular to the shield 10.

Another manner of mounting the magnets 50, when for example the support is narrow in a direction parallel to the plane of the sheet in the desired shield position, is illustrated by Fig. 14. There the longer projections 52 extend through respective openings 54 with the adjacent surfaces of the magnets lying against the shield 10 in which position both magnets may be secured as by application of a keeper bar 13 against the poles afforded by the relatively longer projections 52 but on the opposite side of the shield from that against which the magnets lie. In the mounting of the magnets 50 according to Fig. 14 the attaching poles are spaced as widely apart as desired but in the general direction of the adjacent margin of the shield, and said magnets form with the keeper bar essentially a horseshoe magnet with two attaching poles. When the coplanar side faces of the magnets are applied to the support then four attaching poles may be rendered effective.

The arrangement according to Figs. 11 to 15 may be further modified by the provision of additional projections on the magnet as at 57 and 58, which projections are positioned to be inserted in holes 60 directly beneath the openings 54 and 55. In event of using such additional projections the projections 51 and 52 would not have to be non-circular in order to prevent rotation of the magnet sections 50 out of shield supporting position.

I claim:

1. An industrial safety shield comprising a shield element and permanently magnetic means secured thereto and having surface areas of opposite polarity exposed for contact with a support.

2. An industrial safety shield comprising a translucent plastic sheet serving as a shield and a mounting member of permanent magnetic material secured to the sheet at one edge and with pole surface areas exposed for magnetic contact with a support.

3. An industrial safety shield comprising a translucent sheet serving as a shield and a mounting member secured thereto in the form of a permanent horseshoe magnet with the poles exposed at one edge of the sheet.

4. An industrial safety shield comprising a sheet of translucent material having an opening therein, a horseshoe magnet having its poles projecting adjacent one edge of the sheet and means secured in the throat of the magnet and detachably secured to the sheet at said opening therein.

5. An industrial safety shield comprising a translucent plastic sheet having an aperture near one edge and a permanent magnet demountably attached to the sheet at the aperture.

6. An industrial safety shield comprising a translucent plastic sheet having an apertured flange near one edge and a permanent magnet permanently attached to the sheet at the aperture.

7. The arrangement according to claim 6 in which the magnet is of the horseshoe type and portions of the flange are diverted into contact with relatively converging inner and outer edge surfaces of the magnet to hold the magnet against movement in either direction along an axis passing between the poles.

8. An industrial safety shield comprising a sheet of plastic material, a horseshoe magnet secured to the sheet along a transverse axis passing through the throat of the magnet, portions of said sheet being diverted out of the principal plane of the sheet into abutment with opposite side edges of the magnet to prevent rotation of the magnet out of position.

9. An industrial safety shield comprising an elongated sheet of translucent material, a permanent magnet adapted to be secured to the sheet and means for mounting the magnet on the sheet selectively along relatively longer and shorter edges of the sheet.

10. As an industrial safety shield, in combination, a sheet of translucent material, a block having a slot therein substantially the width of said sheet and receiving the same, a magnet recessed into said block on a side thereof generally opposite the slot and a keeper bar for the magnet embedded in the block and in contact with pole portions of the magnet to hold the magnet in place in the recess.

11. As an industrial safety shield, a sheet of translucent material having associated therewith at or near one edge a magnet having pole elements with faces projecting transverse to the principal plane of the sheet and adapted for selective sheet supporting application to ferrous surfaces which extend generally at right angles to each other.

12. An industrial safety shield comprising a shield element and permanently magnetic means secured thereto and having a pair of coplanar surfaces of opposite polarity and another pair of coplanar surfaces of opposite polarity with respect to each other and angularly disposed with respect to the first coplanar surfaces, both said pairs being exposed for contact with a supporting surface whereby to support the shield in respectively different positions relative to such supporting surface.

13. An industrial safety shield comprising a shield element, permanently magnetic means having surface areas of opposite polarity exposed for contact with a support, and means for securing the shield element and permanently magnetic means together in different relatively adjusted positions with respect to each other.

14. An industrial safety shield comprising a shield element, permanently magnetic means having surface areas of opposite polarity exposed for contact with a support, and pivot forming means for securing the shield element and permanently magnetic means together in different relatively adjusted positions with respect to each other about the pivotal axis of the securing means.

WILLIAM DILLEY.